United States Patent [19]

Washecka

[11] Patent Number: 5,566,499

[45] Date of Patent: Oct. 22, 1996

[54] COLLAPSIBLE BAIT TRAP AND DECOY CAGE TO TANTALIZE AND ATTRACT PREDATOR FISH

[76] Inventor: John Washecka, 8915 Fairway Hill, Austin, Tex. 78750

[21] Appl. No.: 412,933

[22] Filed: Mar. 29, 1995

[51] Int. Cl.[6] .......................... A01K 69/06; A01K 71/00; A01K 69/10
[52] U.S. Cl. .................. 43/100; 43/102; 43/103; 43/104; 43/105
[58] Field of Search .................. 43/100, 102, 103, 43/104, 105

[56] References Cited

U.S. PATENT DOCUMENTS

| | | | |
|---|---|---|---|
| 4,237,645 | 12/1980 | Kinser | 43/105 |
| 4,411,092 | 10/1983 | Lalancette | 43/100 |
| 5,325,623 | 7/1994 | Sakuraoka | 43/105 |

FOREIGN PATENT DOCUMENTS

| | | | |
|---|---|---|---|
| 1822692 | 6/1993 | U.S.S.R. | 43/105 |

Primary Examiner—Jack W. Lavinder
Assistant Examiner—I.-H. Lin

[57] ABSTRACT

A collapsible bait trap for fisherman comprised of an annular top and bottom panel, each with a peripheral edge and a flexible net paneling joining the top and bottom panels. The invention utilizes a novel shape composed of a multi-cylindrical configuration. The sides of the cylindrical chambers, where they join together, form a funnel through which the fish enter the invention. This improved trap advantageously has a multi-cylindrical configuration which substantially reduces the possibilities for the fish to escape or to injure themselves, thus substantially increasing the total efficiency of capture. Once sufficient bait fish are captured, the invention may be relocated for use as a decoy to stimulate and attract game fish. The captured fish will be excited and resonate their fear by making noises and grunts, creating vibrations that attract the predators pursued by the fisherman.

2 Claims, 6 Drawing Sheets

COLLAPSIBLE BAIT TRAP AND DECOY CAGE TO TANTALIZE AND ATTRACT PREDATOR FISH

BACKGROUND OF THE INVENTION

1. Field of the Invention

This invention creates a new and improved trap for catching small fish. The novel design of this invention takes advantage of the fact that when two cylinders are adjacent to each other they will form a converging entrance which serves as a funnel to the invention. The novel shape of this invention prevents the captured fish from escaping or injuring themselves within the trap. Once sufficient small fish have been captured, the trap and a portion of the catch will be used as a decoy to entice larger or game fish to a specific area. At the completion of this task, the trap will be collapsed into the top panel, creating a compact package of minimum space.

2. Description of Prior Art

Using traps to gather bait fish is centuries old. Most of the known art uses some type of rectangular structure as an openwork cage, having one or two open ends which are closed, or approximately so, by truncated conical funnels. Such prior art traps are usually made of a metal net like material which is susceptible to rusting after a period of time.

The current art utilizes some type of food cage which is located in the middle of the trap. The target fish detects the food from outside the trap. The target fish may be at a side where there is no opening, and to get to the food the target fish would have to swim around a corner, away from the food, and may thereby lose interest in the food. This fault contributes to the reduced efficiency of capture in prior art.

The current art is mostly rectangular shaped with corners on each side of the trap and corners at the fish entrances. The target fish can get entangled and injured in these corners. Those injured or killed are not very effective as live bait and are simply discarded by the fisherman. This waste affects the efficiency of the known art.

Another problem with known type of bait traps which are collapsible is that they are of material that is rigid either being plastic or metal. Both materials limit the degree to which the traps may be collapsed, making the trap heavier and more bulky than is desired for convenient portability.

Still another problem with known bait traps is that they are not made so that they can be easily handled, stored, and shipped in a safe, convenient, and inexpensive form and manner.

In view of the foregoing disadvantages inherent in the known types of small fish traps now present in the prior art, there continues to be a need for a new and improved fish trap apparatus as set forth by the instant invention which addresses both the problem of "ease of use" as well as effectiveness in construction. In this respect, the present invention substantially fulfills this need.

Known prior art devices which may be pertinent to this invention are listed as follows U.S. Pat. Nos.:

2,979,855—Apr. 18, 1961
3,906,654—Sep. 23, 1975
3,906,655—Sep. 23, 1975
4,134,225—Jan. 16, 1979
4,979,328—Dec. 25, 1990
5,076,007—Dec. 31, 1991
5,119,584—Jun. 9, 1992
5,131,184—Jul. 21, 1992

None of these devices offers the new and novel features of the invention disclosed herein.

SUMMARY OF THE INVENTION

The general object of the current invention is to provide an inexpensive device that is most effective in capturing bait fish; then using the invention and the surplus bait fish as an attractant for game fish. When the invention is not in use, it can be collapsed into a compact package which will take minimum space.

This invention relates to certain new and useful improvements in a trap which is ingeniously designed and structurally and expressly adapted to skillfully and effectively catch small fish.

The invention resides not in any one of these features per se, but rather in the particular combination of all of them herein disclosed and claimed and it is distinguished from the prior art in this particular combination of all its structures and for the functions specified.

There has thus been outlined, rather broadly, the more important features of the invention in order that the detailed description thereof that follows may be better understood, and in order that the present contribution to the art may be better appreciated. There are, of course additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purposes of the foregoing abstract is to enable the U.S. Patent and Trademark Office and the public generally, and especially the scientists, engineers and practitioners in the art who are not familiar with or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new improved collapsible fish trap and attraction and stimulus (decoy) for game fish that has all the advantages of the prior art while simultaneously overcoming some of the disadvantages normally associated therewith.

This invention relates to new and useful improvements including a novel shape whereby said trap will be more efficient in both capturing and keeping small fish alive. The design of this invention takes advantage of the fact that when two cylinders are adjacent to each other, they will form a converging conical shaped entrance that serves as a funnel to the fish entrances in this invention.

An object of this invention is to provide a flexible container which would allow the bait to freely enter, unharmed, and yet prevent its easy exit therefrom.

An object of this invention is to trap as many bait fish as possible while at the same time not allowing those caught to escape. Once the target fish detects the feed in the center of the invention, that fish will follow the rounded outer wall of the invention towards the feed. Which every way the target fish goes, the shortest distance to that feed always leads to the funnel (that area between two cylinders) and ends with the target fish going through the trap door to the inside of the invention. This design corrects the problem of the target fish having to go around corners in the current art.

An object of this invention is to keep all small fish captured unharmed. It is natural that the captured fish will try to escape any confinement. After consuming the feed, the target fish will try to escape. The first physical object the target fish encounters is the narrow net walls in the center chamber and the plastic self locking cable ties that hold the plastic door frames to that net wall. The target fish avoids these physical objects and swims into outer-circular chambers. The circular chambers have no openings to escape or corners to get trapped and injured in.

It is an object of this invention to encourage fishing to take place in an environmentally sound manner by not destroying or injuring the creatures that it is intended to catch. Those captured bait fish will be effectively utilized or returned unharmed to the sea. This avoids injuring or killing bait fish that would be needlessly wasted as in the current art.

A primary concern in the design of a one-way entrance into a fish trap is ensuring that the least amount of resistance is encountered by the target fish entering the trap.

If too much resistance is encountered by the target fish, it is unlikely that they will enter the trap. The entrance doors to this invention are at the mouth of the funnel, the place nearest the feed. The doors in one variation of this invention are of a molded plastic and attached to the net siding by plastic cable ties. The cable tie would be attached from inside the trap, leaving the unused plastic tail of the cable tie to act as an obstacle and discourage the bait fish from leaving the trap.

An object of this invention is to allow the fisherman to separate and categorize those caught into three categories:

1) The first category would be those captured small fish that will be able to be used as live bait. They would be removed from the invention and used as intended.

2) The second category would be those small fish that are too large or not appropriate for bait; they would remain in the invention. The invention and those captured that are inappropriate for bait fish, would be moved to an area that the game fish are believed to be in. Those fish within the invention would be making noises which would attract and tantalize game fish. The excitement and disturbance the trapped fish make will lure game fish to the area to investigate.

3) The third category would be those small fish that cannot be legally caught or are immature and not effective as bait; these fish would be returned to the water unharmed.

An even further object of the current invention is to provide a new and improved fish trap and holding system which is susceptible to a low cost of manufacture with regard to both materials and labor. This permits a low sales price to the consuming public, thereby making such fish trap and decoy economically available.

Another object of this invention is to fulfill the desire of those fishermen who would like to have a live bait trap as part of their standard fishing equipment. Unfortunately, the current art is not efficient in catching small fish and too bulky to be part of the fisherman's standard equipment.

An object of the present invention is to provide a novel collapsible bait trap which can be easily stored and transported in relatively small volumetric form and yet easily and quickly erected to the full and open state ready for use as a catching trap.

Another object of this invention is to provide a method of making an inexpensive, collapsible bait trap which will be completely formed in a simple, strong, durable manner, and yet provide a trap which is light weight, easily stored and transported in a small compact form.

The present invention is preferably made of all rigid plastic material and a nylon type net and is, therefore, substantially impervious to rust.

Other features and advantages of the present invention will become apparent from the following detailed description of certain embodiments thereof, taken in conjunction with the accompanying drawings.

These, together with other objects of the invention, and with the various features of novelty which characterize the invention, are pointed out with particularity in the claims annexed to and forming a part of this disclosure. For a better understanding of the invention, its operating advantages, and the specific objects attained by its uses, reference should be make to the accompanying drawings and descriptive matter in which there are illustrated the preferred embodiments of the invention.

BRIEF DESCRIPTION OF THE DRAWINGS

One of the preferred embodiments of the fish trapping device and holding system that is the subject of this invention is the use of semi-circular chambers. This allows fish from any direction to quickly find an entrance into the trap. The invention can use as few as two semi-circular chambers and would be limited only by one's imagination. For purposes of illustration the invention will be shown with four semi-circular chambers.

Referring to the drawings in detail, it will be seen that one preferred embodiment of the invention is in accordance with the principles and teachings of the present invention.

DETAILED DESCRIPTION OF PREFERRED EMBODIMENTS

Figure 1:
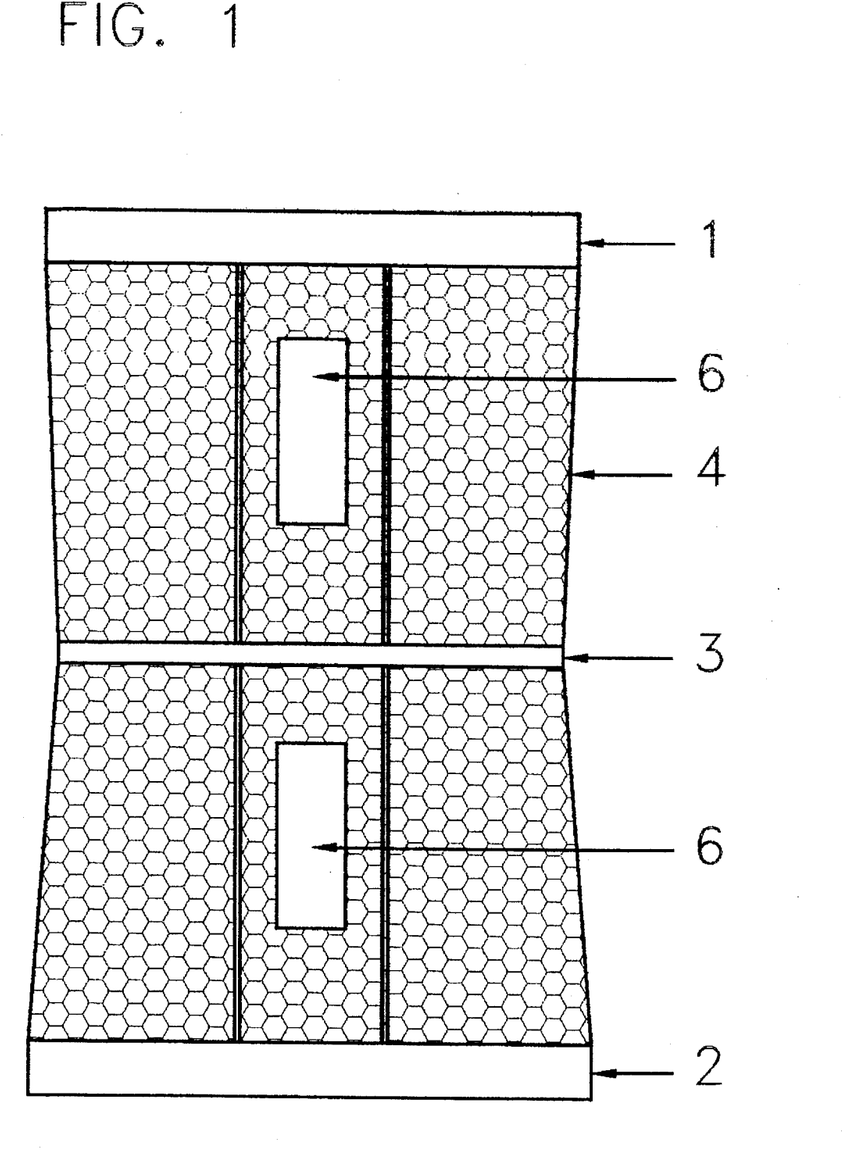
FIG. 1 is a side view of the improved fish trapping and holding system of this invention in the erected or expanded position.
Figure 2:
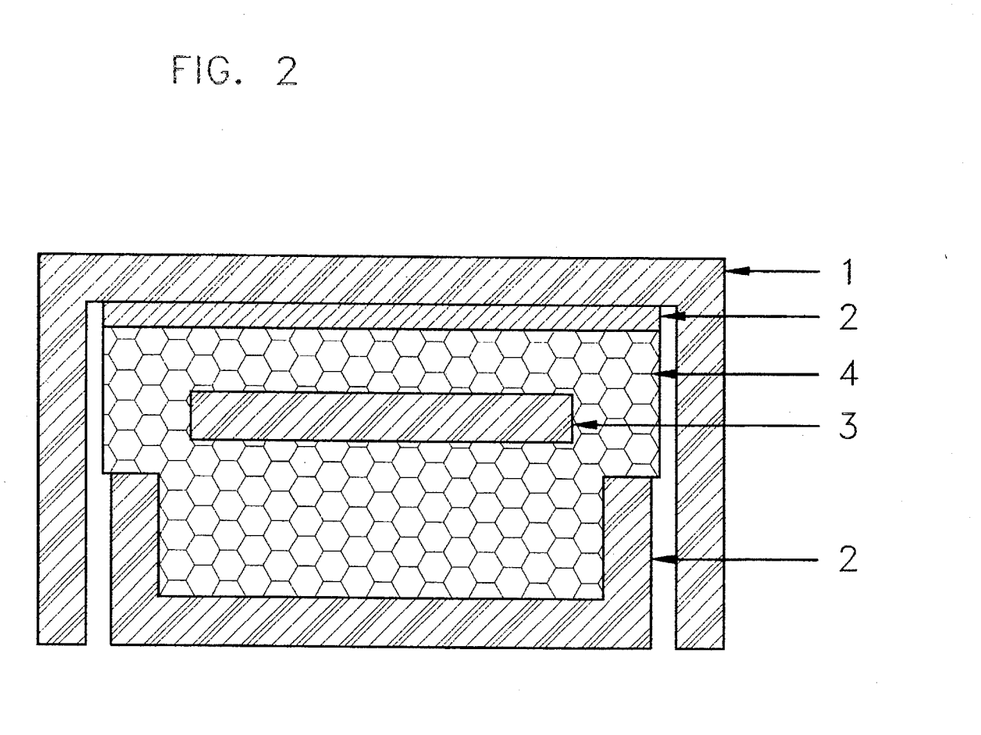
FIG. 2 is a cutaway of the improved fish trapping and holding system in the collapsed, flat position.
Figure 3:
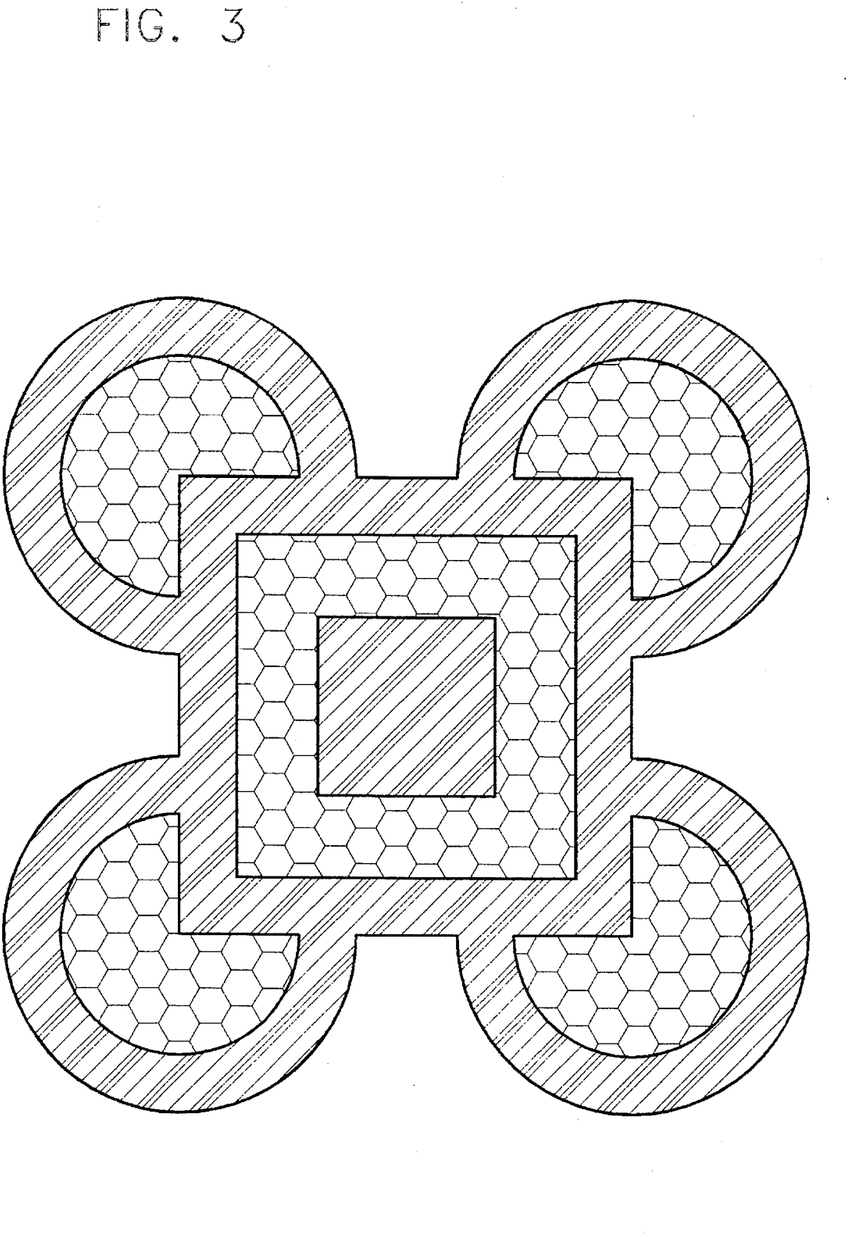
FIG. 3 is a top view of the top panel of the invention.
Figure 4:
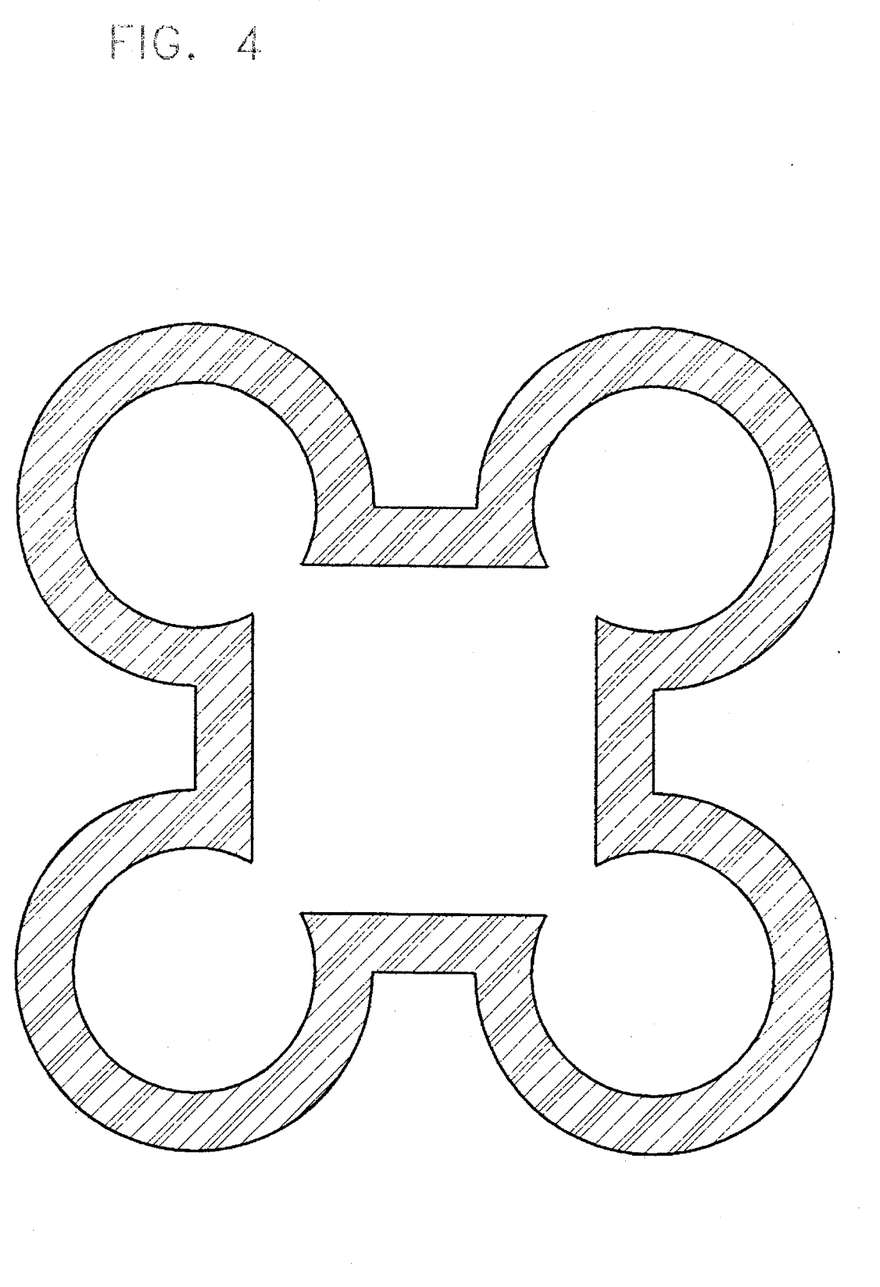
FIG. 4 is a top view of the ring panel of the invention.
Figure 5:
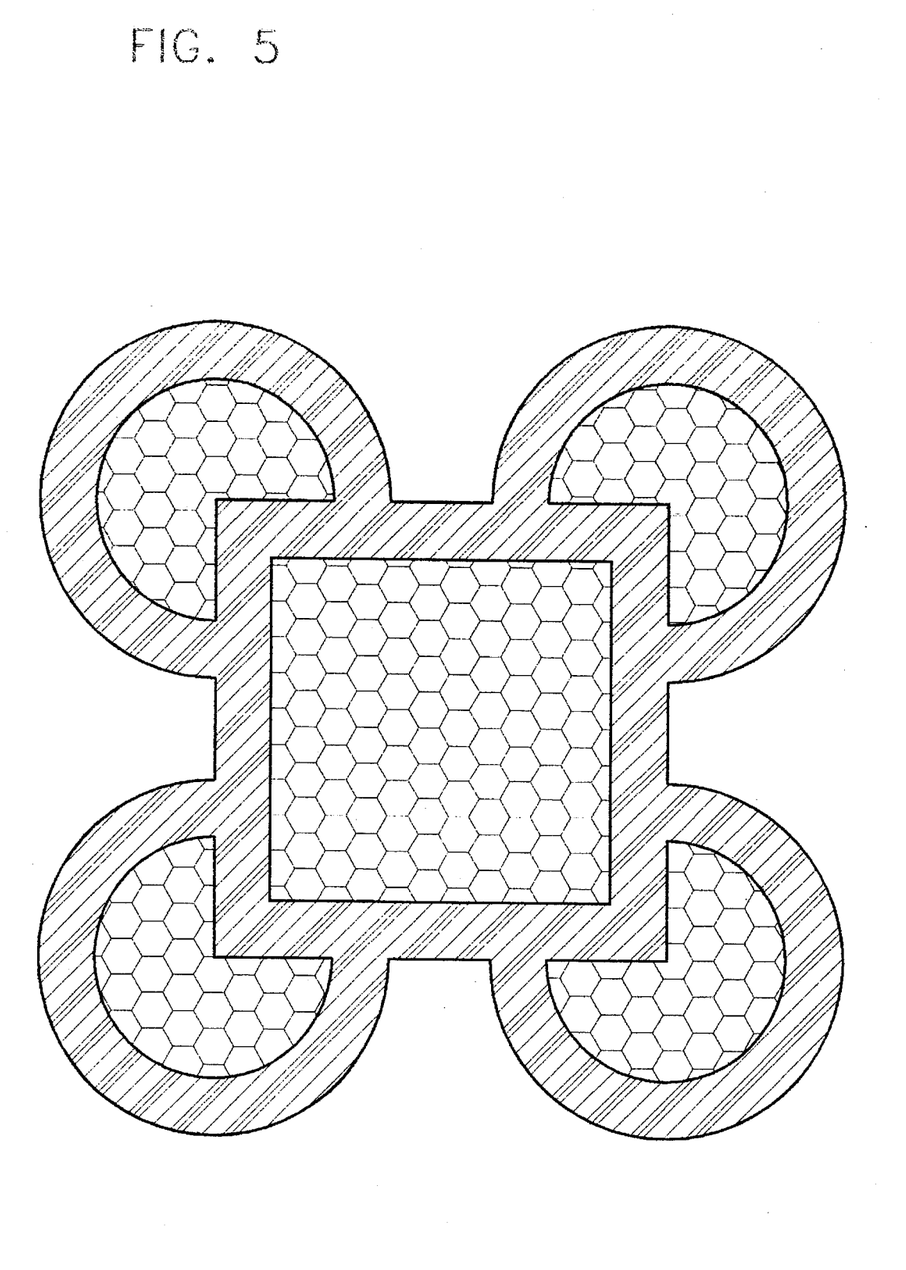
FIG. 5 is a top view of the bottom panel of the invention.
Figure 6:
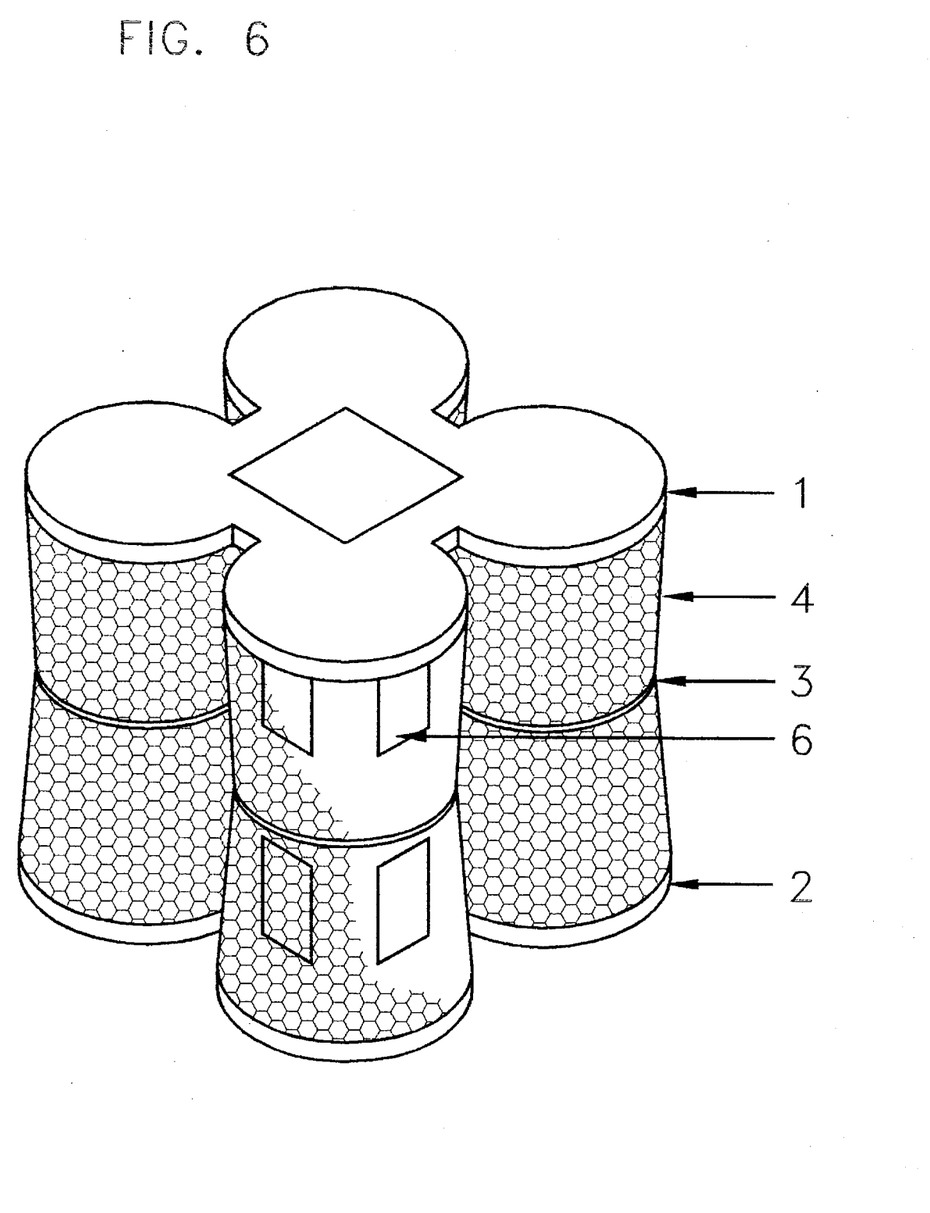
FIG. 6 is a 3-D view of the preferred trap of this invention in the erected or expanded position, showing all parts but with a minimum of mesh being shown for purposes of clarity.

With reference now to the drawings, and in particular to FIGS. (1), (2), and (6) thereof, a new and improved collapsible bait trap and decoy cage illustrate one preferred embodiment which is made in accordance with the principles and teachings of the present invention to entice, trap and hold fish.

The collapsible fish trapping device of this invention has a number of new and unique features. Generally the invention utilizes a novel shape composed of a center cell, where the fish food would be placed, attached to a series of multi-cylindrical chambers. In the preferred embodiment there are four cylindrical chambers spaced in a radially symmetrical manner around the center cell. The sides of the cylindrical chambers, where they join together, form a funnel which leads to the fish doors and the entrance to the invention.

The top (1) and bottom (2) panels and the ring (3) would all be shaped in a multi-cylindrical configuration and made of a rigid plastic material as a unit with a molding gate at the center of the top panel (1).

The top (1) and bottom (2) panels are comprises of an annular rim with a screened area to allow the free flow of water within and defined by the rim. The top panel (1) would have a portion molded in such a way to be severable and to define a hinged trap door. Each of the top (1) and bottom (2) panels would have a peripheral edge that would have a cooperating means for attaching the side netting material (4) to said top (1) and bottom (2) panels. Said side netting (4) would then be fastened to the top (1) and bottom (2) panels.

The top (1) and bottom (2) panels are in the same unique shape. In addition there is a rigid plastic ring (3) that parallels the unique shape of the top (1) and bottom (2) panels. The ring (3) would be attached to the net siding (4) at approximately the middle of the net siding. The purpose of the ring (3) is to maintain the unique shape of this invention in the side netting material (4).

In size the ring (3) would be slightly smaller than the bottom panel (2) and would fit into the bottom panel (2) when the trap is compressed. FIG. 2 The bottom panel (2) would be slightly smaller than the top panel (1) and along with the side netting (4), would fit into the top panel (1) when the trap is compressed. FIG. 2.

The invention uses a flexible net like material for the side panel (4) and rigid plastic top panel (1), bottom panel (2) and middle ring (3), which when joined by the net sides (4) gives the trap both form and shape. The side panel (4) of the invention is made of a flexible mesh or net like material. The nylon side netting provides this invention with the ability to be compressed into a small manageable fish trap. FIG 2.

The term "plastic" is used herein consistent with its broad dictionary definition, i.e. an organic substance of large molecular weight, solid in its finished state and shaped by flow in its process of manufacture and also including inorganic materials of a similar character (definition from ASTMD 833-54T and The Condensed Chemical Dictionary, 5th Edition, published by Reinhold Publishing Corporation).

The top panel (1) has flotation material built (5) into it and the bottom panel (2) has weight manually added as need. While under water, the floating top panel (1) and the weighted bottom (2) cause the trap to remain in the open extended position. Once out of water, the net material (4) naturally collapses into the top (1) and bottom (2) panels. The simplicity of the system obviates the need for more mechanically complex traps presently being used. The rigid plastic top panel (1), bottom panel (2) and side ring (3) provides the trap with both structural integrity and longevity. It should be noted that there are not horizontal frame or support members, leaving it completely open structurally except for the pliable mesh material.

The number (5) denotes a block of buoyant material, such as closed-cell foam plastic. This buoyant material is attached to the top panel (1) and is sufficiently buoyant to keep the invention close to the surface of any body of water in which the device is placed. Sufficient weights would be placed on the bottom panel (2) to cause the trap to the extended position and maintain the trap on the bottom in a fish catching position. FIG. 1.

Some of these weights would be removed and the invention would now float and be able to be used as a decoy. The invention would be moved to the desired sport and held in said location by a tether or other suitable means.

In addition to attracting game fish to a specific area the invention is now a visual target for the fisherman, who will try to place his hook and live bait as close as possible to the invention. The game fish will be circling the invention looking for escapees.

At the completion of the day, the fish in the trap could be released unharmed. Because those captured in this invention are not injured or killed and because those small fish used as decoy in this invention are also not injured or killed, the use of this invention is environmentally sound.

The number (6) denotes an outlet opening, fish doors, which are generally rectangular in form, and which are large enough to permit fish to pass through it. Said door (6) is made in a rigid plastic and is attached from the inside of the net siding material with plastic cable ties. The ends of these cable ties would not be removed and act as an array of fingers surrounding the opening and discouraging the target fish from leaving the trap.

As soon as the target fish realize that they are confined within the invention they will try to escape. The target fish will avoid the obstacle of plastic cable tails affixed to the plastic fish door (6) and will swim against the inner wall of one the circular chambers, away from the fish doors and any chance of escape. Thus once caught, most of the target fish will remain inside the trap in the holding area of the cylindrical chamber. The fish doors readily permit the entry of the target fish and at the same time discourage the efforts of the target fish to escape.

Accordingly, there is provided a collapsible small fish trap and holding system which can be easily assembled and disassembled with a minimum of effort and which can be stored in a minimum of space.

What is claimed as being new and desired to be protected by Letters Patent of the United States is as follows:

1. An improved collapsible fish trapping and holding system including a substantially multi-cylindrical shaped receptacle having a centrally located feed compartment and two or more semi-cylindrical chambers attached to the centrally located feed compartment which comprises:

(a) a substantially multi-cylindrical floating top panel;

(b) a substantially multi-cylindrical bottom panel slightly smaller than the top panel;

(c) a substantially multi-cylindrical reinforcing or rigidifying ring slightly smaller than the bottom panel;

(d) a collapsible, flexible net vertical side panel connected to the top panel and bottom panel;

(e) the multi-cylindrical ring would be attached approximately in the middle of the net side panel;

(f) a funnel which is created when two semi-cylindrical chambers are adjacent to each other they will form a converging conical shaped entrance that serves as a funnel into the trap system;

(g) a fish trap entrance gate molded on the top panel;

(h) fish doors are attached to the net vertical side panel at said funnel with a self locking cable tie, the unused portion of the cable tie acts as an obstacle to trapped fish leaving through the fish doors;

(i) cable ties are attached from the inside of the trap, the end of the cable ties are not cut and will remain as an obstacle to fish trying to leave the trap by means of the fish doors;

(j) all parts, with the exception of the net side panel are made of a rigid plastic or fiberglass;

(k) the net side panel is comprised of a nylon or other man made material that is for use in the salt water.

2. The improved collapsible fish trapping and holding system of claim 1 where the net side panel fits into the top or bottom panel to form a small compact package.

* * * * *